Oct. 1, 1929.   P. J. CLIFFORD   1,729,705
AUTOMATIC TRAIN STOP SYSTEM
Filed March 24, 1919   5 Sheets-Sheet 2

Inventor:
Patrick J. Clifford,
by Spear, Middleton, Donaldson & Spear
Attys.

Oct. 1, 1929.  P. J. CLIFFORD  1,729,705
AUTOMATIC TRAIN STOP SYSTEM
Filed March 24, 1919   5 Sheets-Sheet 3

Inventor:
Patrick J. Clifford,
by Spear, Middleton, Donaldson & Spear
Attys.

Oct. 1, 1929.  P. J. CLIFFORD  1,729,705
AUTOMATIC TRAIN STOP SYSTEM
Filed March 24, 1919   5 Sheets-Sheet 4

Inventor:
Patrick J. Clifford,
by Spear, Middleton, Donaldson & Spear
Attys.

Patented Oct. 1, 1929

1,729,705

UNITED STATES PATENT OFFICE

PATRICK J. CLIFFORD, OF AVOCA, PENNSYLVANIA, ASSIGNOR, BY MESNE ASSIGNMENTS, TO TRAIN CONTROL CORPORATION OF AMERICA, A CORPORATION OF DELAWARE

AUTOMATIC TRAIN-STOP SYSTEM

Application filed March 24, 1919. Serial No. 284,731.

This invention provides means whereby a train may be brought to a stop automatically when a danger signal is set against it, thus preventing an engineer, through carelessness or incapacity, from running by a danger signal, the train under such circumstances being brought to a stop.

My system also includes means by which an engineer, so long as he is attending to his duty and is recognizing the caution signal can maintain his control and keep the train running, should he so desire, but at such a reduced speed that liability of accident is removed.

In other words by my improvements when a caution signal is set against him the engineer must control the speed of his train or else the control will be taken from him and automatically exerted by my mechanism to bring the train to a stop.

The improvements are designed to be combined with the standard Westinghouse air brake system, or any other system, and the attachments for automatically stopping the train are operated by air pressure from the equalizing reservoir of such system, with the result that if any rupture accidentally occurs in any of the parts the pressure in the equalizing reservoir will be reduced by escape of air at the broken part and as a result the piston in the automatic brake valve ($H^6$) of the Westinghouse system will rise and open the exhaust port for the escape of train pipe pressure and the setting of the brakes. Therefore, it will be understood that, so long as the parts and various connections of the improvement are properly functioning they will stop the train under the conditions above noted, or, if any break occurs in the parts or their connections the train will be stopped as a consequence of the reduction of pressure in the equalizing reservoir of standard pattern from which the improved system derives its air pressure.

In the accompanying drawings;

Fig. $2^a$ is a view of details.

Fig. 3 is a view of the actuating or trigger valve.

Fig. $3^a$ is a detail view.

We will first give a brief outline of the operation and then take up the construction and operation of the parts in detail.

Figure 2:
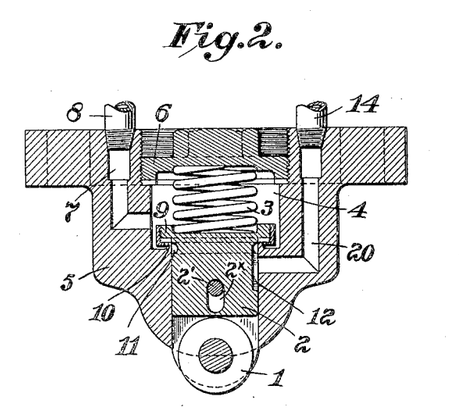
Figure 2 is a vertical sectional view of the contact valve and contact roller, which latter is operated by the track instrument.
Figure 2A:
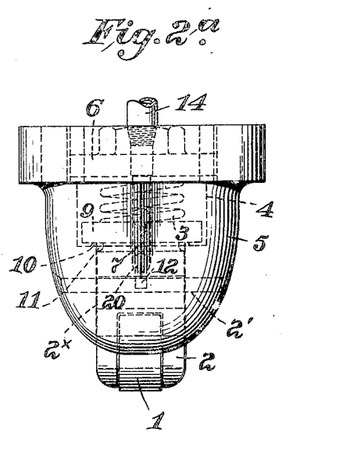
Figures 3, 3A:
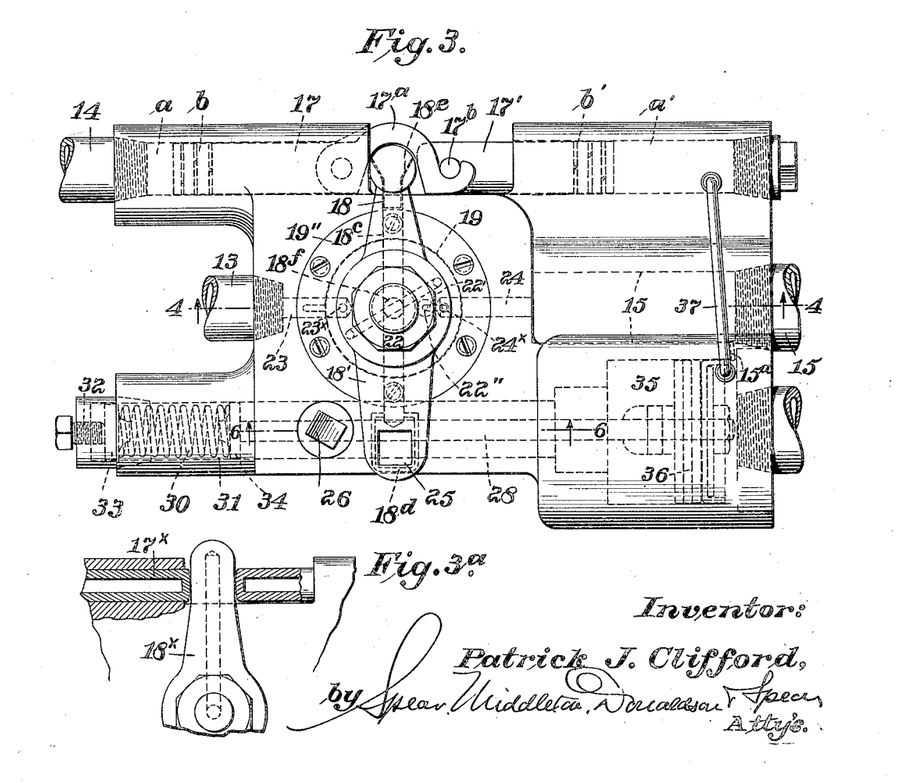

When the roller 1 on the engine strikes the ramp or track implement the contact valve shown in Figure 2 is lifted allowing air pressure from the ordinary equalizing reservoir of the Westinghouse system to pass from pipe 8 to pipe 14 and thence to cylinder $a$, Figure 3, where acting on a piston $b$ a valve 19 is turned through rod 17 and arm 18, the turning of the valve connecting by its passage or port 22 the pipe 13 with pipe 15, so that pressure from the Westinghouse equalizing reservoir can pass to a casing A, causing a valve therein to open port 44' for the release of air from the train pipe, thereby setting the brakes. The air pressure let into the casing A having operated the valve therein passes through pipe 51 to an engineer's disabling valve in casing B and sets this to cut off communication between pipes 50 and 50ª, thus preventing the engineer from recharging the train line pipe, by operating the Westinghouse automatic brake valve H⁶, until after a prescribed period of time has elapsed during which time the train will have come to a stop. This prescribed period of time which must elapse before the engineer can recharge the train line pipe and take off the brakes is due to the fact that the air pressure introduced into the casings at A and B to operate the valves therein must be bled from these parts before these valves can be restored to normal position and the bleeding effect will not be initiated until pressure has built up in pipe 15 sufficiently, that, passing through bleed port 15ª and bleed pipe 37, Fig. 3, the valve 19 will be turned as hereinafter described to cut off communication between pipes 13 and 15 and open bleed port 22″ allowing air pressure to bleed from valve casings A and B, and only when this has occurred can the disabling valve b″, Fig. 10 be reset by the engineer sending pressure through the pipe 57 from the ordinary Westinghouse independent brake valve S⁶.

Now describing the parts and operations more in detail:

In these drawings 1 indicates a roller carried by a stem 2, Fig. 2, normally pressed down by a spring 3 contained in a chamber 4 of the casing 5, which contains and guides the said stem or plunger. The chamber 4 has an air-tight cover 6 and as shown in Figure 1 it receives air from the standard Westinghouse equalizing reservoir through the port 7 and pipe 8, being thus in constant open communication with the compressed air supply in said reservoir.

The plunger or stem 2 is provided with a head or valve member 9 provided with suitable packing and resting on the seat 10, and below the head the stem has a circumferential groove 11 and in one side of the stem there is formed a passage 12 communicating with the said annular groove and also with a discharge port or passage 20 extending through the casing 5 and having a pipe 14 extending therefrom to a cylinder a containing a piston b connected by a rod 17 with the arm 18 of a rotary trigger valve member 19, Figs. 3, 4 and 5, which controls the inlet or delivery of air pressure from the equalizing reservoir through the pipes 13 and 15 to the automatic air release valve A, which controls the automatic setting of the brakes, this valve 19 having the port or passage 22, Figs. 3, 4, 5 and 7, which, when the valve is turned into a certain angular position, will connect the passages 23, 24, leading through the casing from the pipe 13 and to the pipe 15 respectively, the position of the valve in Fig. 3 being its normal one with the pipes 13 and 15 out of communication and hence the air from the reservoir is cut off from said pipe 15.

Figure 1:
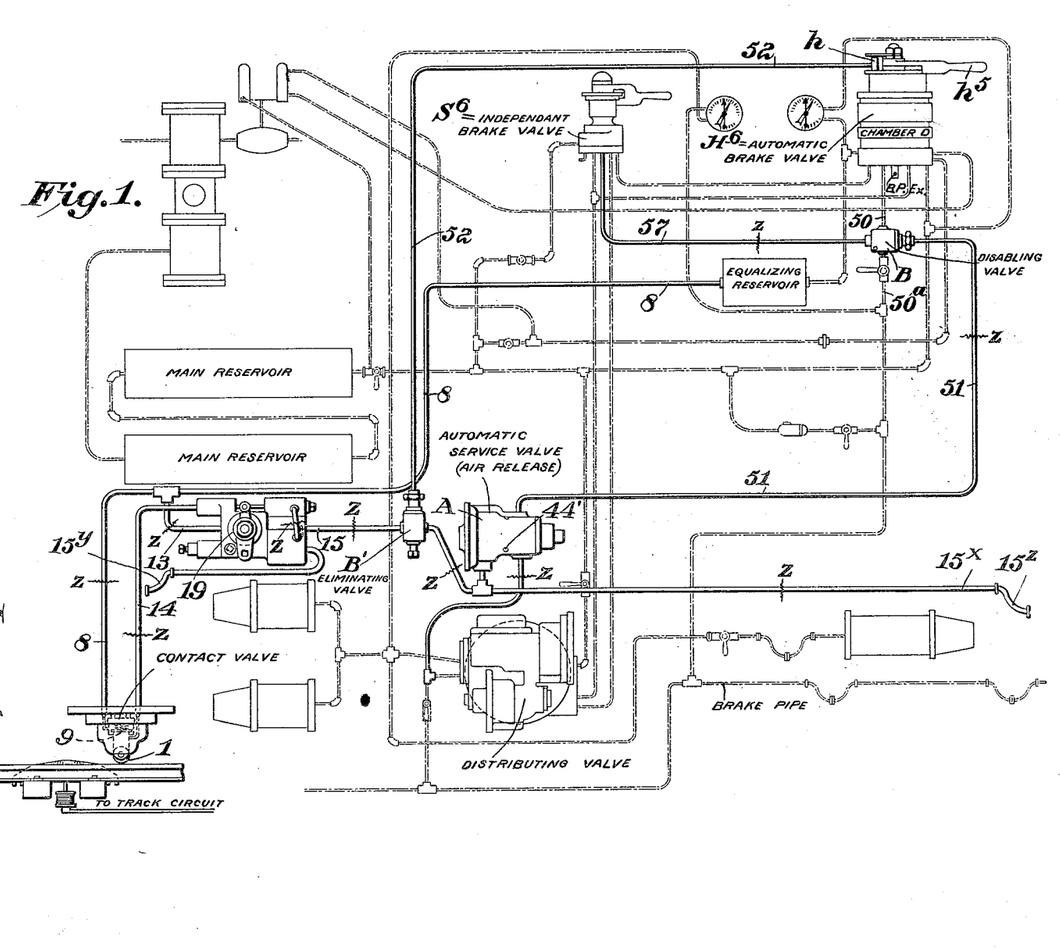
Figure 1 is a diagram of the complete system, the new parts being represented by the heavier lines, while the parts of the ordinary Westinghouse system are indicated by light lines with the ordinary pipe connections between them represented by dotted lines.

With the parts as described thus far it will be seen that when the stem or plunger 2 is raised by its roller running over the track instrument or ramp air from the equalizing reservoir will pass through the pipe 8, passage 7, chamber 4, annular groove 11, due to the lifting of the head or valve member 9 from its seat, and the air will thence pass through the port 12, passage 20, and pipe 14 to the cylinder a, Fig. 1, where acting upon the piston b the rod 17 through arm 18 will turn the valve 19 and thus pipes 13 and 15 will be thrown into communication and the air from the equalizing reservoir will pass through these pipes to the automatic air release valve A to set the brakes and to the engineer's disabling valve shown generally at B.

The valve arm 18, when the valve is operated, as just described, is set in an angular position of about thirty degrees. This valve also has an arm 18′ which, when the valve is turned as just described, presents an opening 25 to be engaged by a locking bolt 26 spring pressed, as in Fig. 6, and mounted in the casing, said bolt serving to hold the valve in operated position long enough to insure the proper operation of the brakes.

For unlocking the valve and restoring it to normal position the following arrangement is provided:

The bolt 26 is acted on by an incline 27 of a cam slide 28 consisting of a bar attached at one end to a piston 36 in a chamber 35, which chamber at a point back of the piston is connected with the air pipe 15 by a small port 15ª Fig. 3. The other end of the cam slide is acted on by a spring 30 in a casing 31, which spring is adjusted as to its tension by a screw 32 bearing on a washer 33, a second washer 34 being arranged between the spring and the cam slide. A passage or pipe 37 connects the interior of the chamber 35 with the piston chamber a′.

After the piston of the automatic air release valve A and the piston in the engineer's disabling valve B are operated by the pressure supplied thereto through the pipe 15 the pressure will build up in the said pipe 15 and this pressure will now pass into the chamber 35, through small port 15ª, previous to the operation of the pistons just mentioned, and while the flow of air through the pipe 15 is continuing and moving the said pistons of A and B the piston 36 will remain in the position shown at the right of the chamber 35, due to the spring 30, the strength of which is so adjusted that while any air is passing through pipe 15 the spring will hold the piston 36 in the position shown, but as soon as the pistons in the valve chambers of the automatic air release valve A and the engineer's disabling valve B have been operated and the pressure builds up in pipe 15 it will pass through port 15ª and build up also in chamber 35 forcing the piston 36 to the left and thus operating the cam slide to retract the bolt 26 against the pressure of its spring and thus releasing the arm 18' of the rotary valve 19, so that this valve may be returned to normal position, and thus cut off the air from the pipe 15. This operation of the valve back to normal position takes place by the built up pressure of air passing from cylinder 35 through the pipe 37 into the chamber $a'$, where acting on the piston $b'$ it will move said piston leftward, Fig. 3, and through the rod 17' the arm 18 of the valve will be moved leftward, thus returning the valve to normal position.

The return of the valve 19 to normal position, as just stated, cuts off the supply of air to pipe 15 and at the same time brings a passage 22' in the valve to register with the port $24^x$ of passage 24 and the port 22'' for bleeding the pipe 15 and the piston chamber of the automatic air release valve A and the engineer's disabling valve at B. The port of the passage 23 is shown at $23^x$.

The ports $23^x$, $24^x$ extended vertically in a valve seat block $19^x$ on top of which the valve 19 rotates, the port or passage 22 in the valve 19 having vertical portions $22^e$ to register with the ports $23^x$, $24^x$. The bleeding port 22' extends vertically through seat block $19^x$.

Reverting to the contact plunger 2 it will be observed that this is guided by a pin 2' passing through a slot $2^x$, which holds the plunger from turning, and keeps the passage 12 in registration with the port 20. This pin and slot connection also limits the upward movement of the plunger and the roller 1 is kept in proper position to roll properly on the track instrument.

Figures 4, 5, 6, 7, 8:
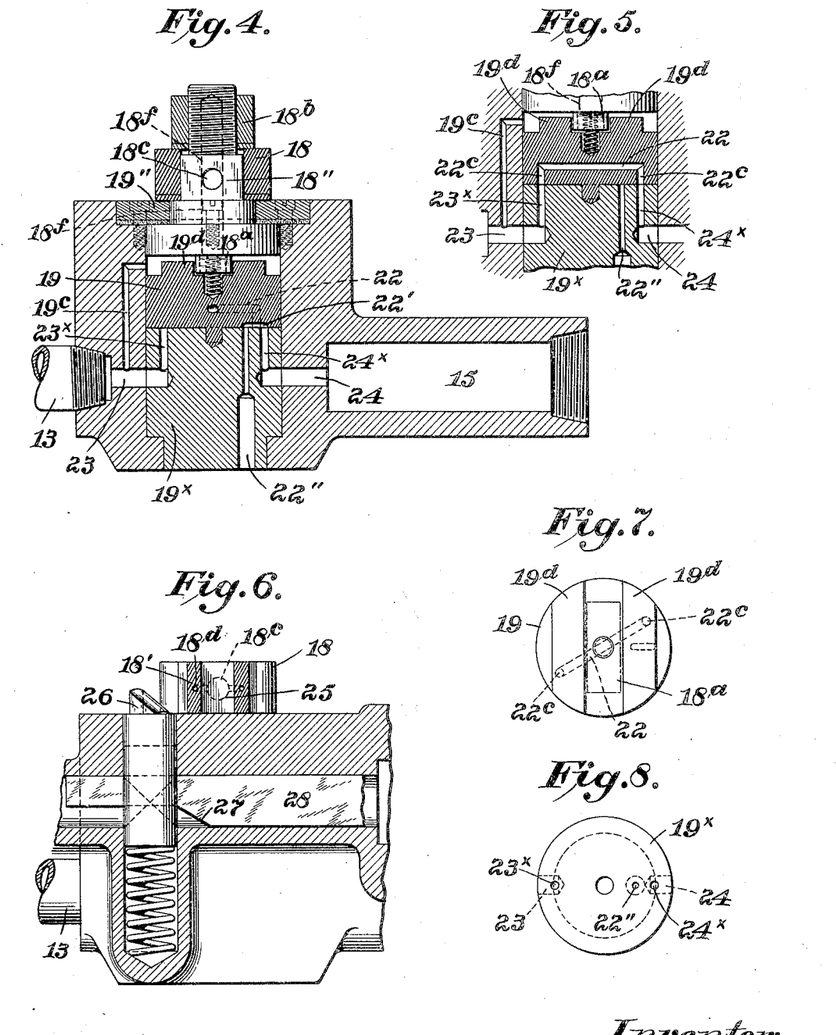
Figure 4 is a sectional view of Fig. 3 on line 4—4 of said figure.
Figure 5 is a similar section of the parts of Figure 4 with the valve member turned at an angle of 30° from the position of Figure 4 to permit passage of air through said valve.
Figure 6 is a horizontal section on line 6—6 of Fig. 3.
Figures 7 and 8 are top plan views of parts of Fig. 4.

Reverting to the trigger valve 19 a port $19^c$ Fig. 5, extends through the casing of this valve from the air pipe 13 to the chamber in which the valve 19 is contained, so as to exert air pressure downwardly on said valve to equalize the air pressure tending to lift said valve, enabling the valve to be easily operated.

The valve block 19 is provided with two ribs $19^d$ on its upper side between which engages a lug or rib $18^a$ of a key or plug, which has a square portion at 18'' to receive the lever 18, and a threaded portion to receive the nut $18^b$. The chamber containing the valve is closed by a cover 19''.

The air pressure in the chamber containing the valve 19 exerts an upward pressure against the plug and keeps it air tight against the washer on the bottom of cover 19''.

Figure 9:
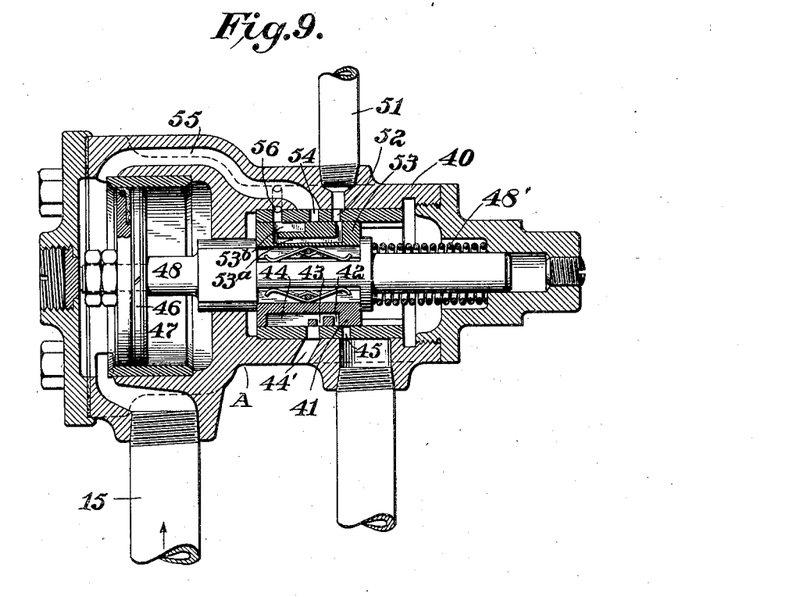
Figure 9 is a vertical section of the automatic air release valve.

The automatic air release valve comprises a casing 40 Fig. 9, in which a valve member 41 slides, said valve having ports 42, 43 of graduated size and a long port 44 by which the air from the train line pipe may be released to atmosphere through the port 44' of the casing, when the valve is moved to the right, thereby bringing the ports, in the order of their size, to the port 45 of the train line pipe for the gradual setting of the brakes. The valve is moved by pressure let into the pipe 15 by the trigger valve 19, which pressure acts upon a piston 46 in the cylinder 47, the stem 48 of this piston carrying the automatic air release valve member 41 along with it.

The automatic air release valve will be returned to normal or closed position by the spring 48' when the air pressure is reduced in pipe 15 by bleeding out through the port 22'' at the trigger valve 19, as above described.

Figure 10:
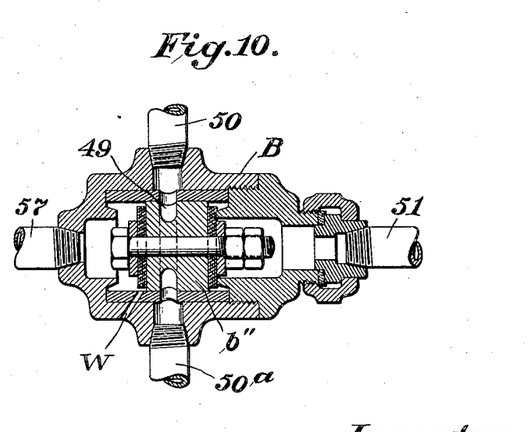
Figure 10 is a vertical sectional view of the engineer's disabling valve.
Figure 11:
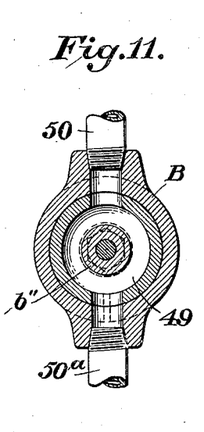
Figure 11 is a transverse sectional view of the valve of Figure 10.
Figure 12:
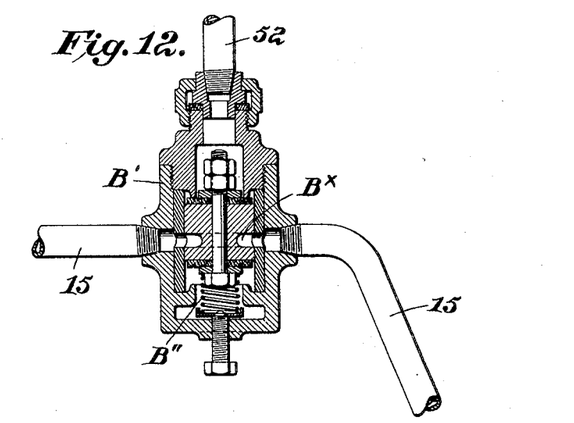
Figure 12 is a vertical sectional view of the eliminating valve.

The engineer's disabling valve B Fig. 10 consists of a floating piston $b''$, Fig. 10, slidable in a casing and having a port or circumferential groove 49 adapted to connect the pipes 50, $50^a$ for the passage of air to recharge the train line pipe, but when the piston is moved to its left hand position, communication between the pipes 50, and $50^a$ will be cut off. A pipe 51 leads to the casing at the right of the said floating piston valve, this pipe extending from a port 52 in the casing of the automatic air release valve Fig. 9. This port is controlled by a valve 53 sliding with the automatic air release valve being connected with the stem of the piston 46. This valve 53 also controls the inlet of air through the port 54 from the pipe 15 by way of the cylinder 47 and by-pass 55 and it also controls a bleed port 56, by which pressure is removed from the right side of the disabling valve at B to allow said valve to return rightward at such time, after said pressure reduction, that the engineer may operate the independent brake valve $S^6$, and send air through pipe 57. The valve 53 has ports $53^a$ and $53^b$ and in Figure 9 it is shown in position to allow the escape or bleeding of the pressure through the ports $53^a$, $53^b$ and 56.

The engineer's independent brake valve $S^6$ has a pipe 57 connected with its exhaust port and this pipe connects with the casing of the disabling valve B at the left of the floating piston thereof. The casing of this valve B has an exhaust port W therein.

It will be understood that when the system is operated by the roller 1 striking the ramp resulting in the release of train pipe pressure through port 44' of valve at A and the setting of the engineer's disabling valve at B in disabling position the engineer cannot recharge the train line through pipes 50, $50^a$ to release the brakes until after the prescribed period of time has elapsed necessary to reset the trigger valve 19 to bleeding position and reduce the pressure on the automatic air release valve and the disabling valve, and only after these actions have taken place can the engineer recharge the train line by operating the engineer's independent brake valve $S^6$, which will move the floating valve to connect pipes 50, 50ᵃ, leading from the automatic brake valve H⁶ of the Westinghouse system, to the train pipe.

In the operation of the apparatus when the trigger valve 19 is operated air will be delivered from the equalizing reservoir through pipe 15 to the piston 46 of automatic air release valve at A thereby setting said valve 41 against the resistance of its spring in position to discharge the air from the train pipe through port 44′ and thus automatically set the brakes. The movement of the piston 46 of this valve at A will also set the valve member 53 in position to deliver air pressure to the engineer's disabling valve at B, this delivery taking place through the by-pass 55, port 54, the valve port 53ᵇ, the port 52 and pipe 51, and as a result the floating piston $b''$ will be forced to the left, thus breaking communication between the pipes 50, 50ᵃ and thus disabling the engineer's valve H⁶, (Westinghouse automatic brake valve), and all other parts of the system because the operation of the engineer's independent brake valve S⁶ (Westinghouse) to admit engine-brake-cylinder pressure through the pipe 57 cannot return the piston $b''$ to the right until the equalizing reservoir pressure is bled out from the right-hand side of the said piston and this reduction of pressure will not occur until after certain actions have transpired and therefore the engineer's valve and system will be cut out or disabled for a prescribed period of time during which the brakes remain set and this time is calculated to be long enough to bring the train to a stop. The actions which transpire during this prescribed period are: the building up of pressure in the pipe 15 beyond the trigger valve after the automatic air release valve 41 and the control valve 53 reach their positions at the right, and after the piston floating valve $b''$ reaches its left-hand position, which built-up pressure results in the unlocking and resetting of the trigger valve to normal position, after which the bleeding of the pipe 15 takes place, through port 22″ allowing the automatic air release valve and the valve 53 to return to normal position and finally the bleeding of the valve casing at B takes place on the right of the piston through the return valve 53 and the port 56 Fig. 9, thus rendering the piston $b''$ in condition to be moved rightward when pressure, at the will of the engineer, is brought to bear on its left side by operating the engineer's independent brake valve S⁶ and sending air through pipe 57.

This predetermined period of time during which the system is disabled may be varied by adjusting the tension of the resistance spring 30, Fig. 3, by means of the screw 32, the adjustment of this screw requiring that the pressure in pipe 15 be built up to a greater or lesser degree in order to overcome the resistance of spring 30 and thus permit the unlocking of the valve 19 and its return to normal position for the bleeding of the connections to the automatic air release valve and the disabling valve at B.

Eliminating valve

The above mentioned system provides for bringing the train to a full stop and presupposes that the engineer is out of service through accident, sickness, or death on reaching the caution signal, or is not paying proper attention to his duty.

These instances are, however, rare as compared with the number of efficient engineers in service and the further improvement now to be described presupposes that the engineer will be in condition to do his duty and it therefore provides means whereby the engineer on approaching a caution signal may continue running his train, provided he is paying attention to his work and slows down the speed of the train upon running into the danger zone.

In carrying out the invention there is provided an automatic stop-eliminating-valve indicated generally at B′, this being located in the pipe 15 which extends from the automatic trigger valve 19 to the automatic air release valve A of the system above described. This automatic-stop-eliminating valve may be of a piston form similar in general aspects to the engineer's disabling valve B, in that the piston valve operates in a cylinder. Air is supplied to this eliminating valve from the automatic brake valve H⁶ by a pipe 52 which extends from a supplemental valve casing $h$, Figures 1 and 13, mounted on the casing of the automatic brake valve and having a supplemental valve $h^2$, therein to control the inlet of air from this automatic brake valve to the pipe 52. This supplemental valve is held on its seat to prevent air passing through the pipe 52 to the eliminating valve by main reservoir pressure. As an illustration, I may employ a cam member $h^3$ on the handle of the automatic brake valve which rides over the ball $h^4$ on the fluted stem of the supplemental valve $h^2$ to force it from its seat, so that when the handle $h^5$ of the automatic brake valve is turned into a position to slow down the train, the ball $h^4$ will be depressed by the tail of the handle working over it and the valve will be opened to allow the air pressure to pass from the space $h^6$ of the automatic brake valve, which air pressure will pass by way of pipe 52 to the eliminating valve operating the piston thereof, so as to cut off communication between the pipe 15 and the automatic air release valve A and engineer's disabling valve B to thereby prevent the operation of these valves and consequently preventing stopping of the train.

Should, however, the engineer fail to put the automatic brake valve H⁶ in service position, i. e. for slowing down the train, the eliminating valve B' will remain in its normal position, allowing communication between the pipe 15 and the automatic air release valve A and engineer's disabling valve B, so that upon the trigger valve 19 operating, as a consequence of the contact member 1 riding over the ramp, air from the equalizing reservoir will pass through the trigger valve, pipe 15 to automatic air release valve A, which will operate to open release port 44' allowing the escape of air pressure from the train line pipe, and at the same time air will pass through the valve casing of the valve A and pipe 51 to the engineer's disabling valve B, setting this in position, such that the engineer cannot restore pressure to the system until a prescribed period has elapsed, this disabling action cutting off communication between the pipes 50, 50ª, which communication is necessary in order to recharge the train line pipe and take off the brakes.

The supplemental valve $h^2$ is pressed normally onto its seat by a spring $h^7$. The eliminating valve is pressed to its normal position to allow air to pass from pipe 15 to the automatic air release valve and engineer's disabling valve by a spring B''. This eliminating valve is of piston form and has a passage $B^x$ for the flow of the air through it when in normal position.

The eliminating action, i. e. cutting out the automatic operation of the automatic stop system can take place only when the engineer places the automatic brake valve $H^6$ in service position.

If, after having placed this valve in service position to slow down the speed, the engineer, by reason of becoming suddenly incapacitated or for any other reason should put the handle of this valve out of service position the air pressure will be taken off from the eliminating valve piston and the spring B'' will force this valve to normal position allowing air pressure to pass to the automatic air release valve A and the engineer's disabling valve B with the result that the train will be stopped automatically and the engineer will be unable to prevent such action.

It will be seen therefore that if the engineer does not put the automatic brake valve in service position on approaching a caution signal the train will be stopped automatically.

If he places it in service position the automatic stop mechanism will be cut out of action and the train will slow down. If he places this valve $H^6$ in service position to slow down, and thereafter for any reason changes its position while arm 18 of trigger valve is held by locking bolt 26, the automatic stop action will take place.

Figure 13:
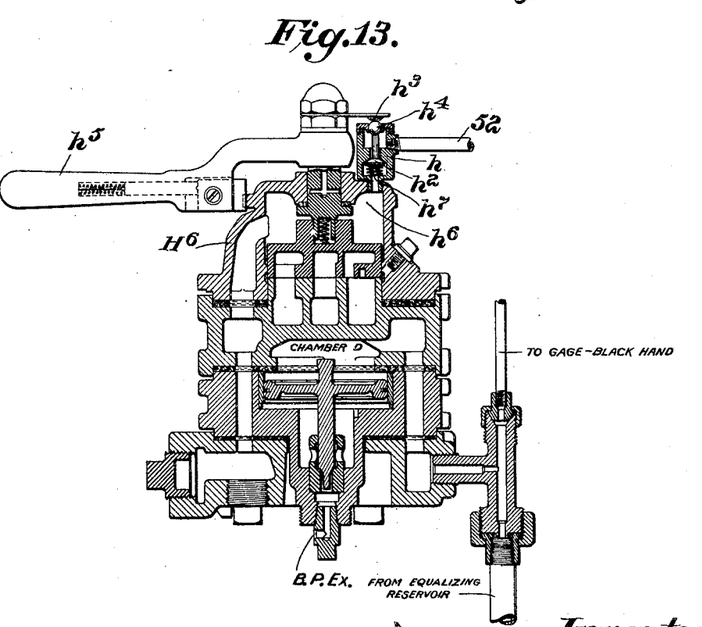
Figure 13 is a view of the Westinghouse automatic brake valve $H^6$ with an attachment forming a part of the present improvement consisting of a supplemental valve which is operated when the engineer sets the valve handle in service position.

It will be understood that as the equalizing reservoir is connected with the standard engineer's valve shown at $H^6$ (called in the Westinghouse literature automatic brake valve) the stopping of the train will be effected, not only when all the parts of the apparatus are in proper working condition, but also when a rupture occurs in any of the connections or when any parts are removed. A rupture of the connections in any part of the improved system will cause a reduction of the pressure in the equalizing reservoir and as a result the pressure in "chamber D" (so lettered in Westinghouse literature) of the automatic brake valve $H^6$, Fig. 13 above its piston will be reduced allowing this piston to rise and this will open the brake pipe "exhaust port" to atmosphere and release train pipe pressure, and set the brakes. This exhaust port is indicated on the drawing at B. P. Ex. Figures 1 and 13.

This action will take place no matter where the accidental rupture occurs in the improved apparatus or attachment, for instance at any of the points marked $z$, whether this be between the equalizing reservoir and the contact valve; or between the contact valve and the actuating (trigger) valve or between the actuating valve and the eliminating valve, or between the eliminating valve and the automatic service (air release) valve, or between the automatic service valve and the disabling valve.

Following out these various contingencies we will suppose that a break occurs between the equalizing reservoir and the contact valve. This will immediately reduce pressure in the equalizing reservoir with the result that the automatic brake valve ($H^6$) will operate because of reduction of pressure in its chamber D and by consequent rise of its piston open its exhaust port to atmosphere for escape of train pipe pressure.

If the rupture occurs between the contact valve 9, Fig. 2, and the actuating valve (trigger valve) 19 pressure in the equalizing reservoir will be reduced, not immediately, but when the contact valve is operated and train pipe pressure will be reduced through the exhaust of automatic brake valve as before.

If the rupture occurs between the actuating (trigger) valve 19 and the eliminating valve B' the pressure in the equalizing reservoir will be reduced as soon as this actuating valve is operated by the setting of the contact valve; in fact if the breakage occurs at any point beyond the actuating valve i. e. between it and the eliminating valve; between the eliminating valve and the automatic service (automatic air release) valve, or between the automatic service valve and the disabling valve the pressure in the equalizing reservoir will be reduced, not immediately, but this will take place as soon as the actuating (trigger) valve is operated by the contact valve.

If a break occurs between the disabling valve and the engineer's independent brake valve this will in no way effect the automatic stopping operation, but will only prevent the engineer from recharging the system until the break is repaired.

In order that my improved control system may operate efficiently with a plurality of locomotives, as for instance on a train provided with a double header, I extend the pipe 15 rearwardly for any suitable distance, as for example to the rear end of the tender, as indicated at $15^x$, Fig. 1, where it terminates in the usual valved flexible coupling $15^z$.

At the front of the locomotive I locate a pipe $15^y$ having a terminal valved flexible coupling adapted to be coupled to the rear end of the pipe extension $15^x$, which pipe $15^y$ communicates with the cylinder 35 in rear of the piston 36.

Supposing pipe $15^y$ of a following locomotive to be coupled to pipe $15^x$ of the preceding locomotive, the operation of lever arm 18 of the front locomotive and consequent admission of air to pipe 15 will operate the brakes as above described. Compressed air flowing through pipe $15^x$ and $15^y$ into cylinder 35 of the rear locomotive will move the piston forward, causing cam bar 34 to depress the dog.

The result of this is that while the track contact device will operate lever arm 18 of the second locomotive, it will instantly return to normal position, owing to the dog being held out of engaging or locking position.

Referring to Figure 3 which shows a lever 18 18' belonging to the trigger valve if either arm of this lever breaks a release of chamber D air will take place and the brakes will be set. To accomplish this the trigger arm or lever is provided with a passage $18^c$ which receives air through the port or passage $18^f$, Figures 3 and 4, from the by-pass passage $19^c$, of Figure 4, these two passages being in communication through the space above the valve 19, Figure 4.

The trigger valve lever is provided with an opening 25 to engage the dog 26 and as shown in Figure 3 a small air passage $18^d$ extends around this opening 25 in the wall of the lever or valve arm, this passage communicating with the air passage $18^c$ so that if breakage occurs at the part of the lever adjacent the opening 25 chamber D air will be released. If breakage occurs at either one of the pistons 17, 17', Figure 3, the coupling $17^a$ will be released and an air valve $18^e$ will be freed from the holding effect of this coupling and the air from chamber D will then be free to escape by this valve.

Another form is shown in Figure $3^a$ in which the arm of the trigger valve is provided with an air port like that above described, but instead of using the coupling $17^a$ between the pistons 17 and 17', as in Figure 3, these pistons in Figure $3^a$ are shown hollow to receive the air pressure within them.

One of these hollow pistons is marked $17^x$.

If either one of these pistons breaks the air will be released and the brakes set. This improvement of Figure $3^a$ avoids the use of the coupling $17^a$ of Figure 3 and of the valve $18^e$ of said Figure 3.

It is obvious that if the trigger arm 18, 18' of Figure 3 is entirely removed this will allow the escape of air from chamber D.

Briefly stated I construct the lever of the trigger valve in such manner that if any portion of the same breaks release of chamber D air will take place because passages in this arm or lever are in communication with chamber D, and this is true also of the pistons 17, 17' which operate the trigger arm.

I claim:

1. In a train stopping apparatus the combination with the train brake line and air release valve therefor, of a cylinder and piston for operating said valve, pipe connections for supplying air pressure to said cylinder and piston, a valve in said pipe connections, means for opening said valve under adverse traffic conditions, means for locking said valve in open position, a device controlled by the building up of pressure in said pipe connections beyond the valve for unlocking said locking means, and means for returning the valve to normal closed position when unlocked, substantially as described.

2. In train stopping apparatus, the combination with the train brake line and air release valve therefor, of a cylinder and piston for operating said valve, pipe connections from said cylinder to an air pressure supply, a valve interposed in said pipe connections, means for opening said valve under adverse traffic conditions, means for locking said valve in open position, and a device controlled by the building up of pressure in said pipe connections for unlocking said locking means.

3. In train stopping apparatus, the combination with an air reservoir, train brake line, and air release valve therefor, of a cylinder and piston for operating said air release valve, pipe connections from said reservoir to said cylinder, a valve in said pipe connections, means for opening and closing said valve, a lever arm connected to said valve, a spring dog for engaging said lever arm when moved, a cam bar adapted to retract said spring dog to release the lever arm, a cylinder communicating with said pipe connections by a restricted passage, and a spring pressed piston in said cylinder connected with said cam bar.

4. In train stopping apparatus, the combination with an air reservoir, train brake line, and engineer's valve, of a normally spring closed air release valve, a cylinder, a piston therein connected to operate said air release valve, means for admitting air from said reservoir to said cylinder, pressure operated means for preventing the engineer's valve from being operated to release the brakes, and means for admitting air from said reservoir to said pressure operated means, said pressure operated means being controlled by the movement of said piston.

5. In train stopping apparatus, the combination with an air reservoir, train brake line, and engineer's valve, of an air release valve, a cylinder, a piston therein connected to operate said air release valve, means for admitting air from said reservoir to said cylinder, pressure operated means for preventing the engineer's valve from being operated to release the brakes, and means for admitting air from said reservoir to said pressure operated means, said pressure operated means being controlled by the movement of said piston, and being timed to admit said air after the air release valve is open.

6. In combination, an air reservoir, and train pipe line, an automatic air release valve, air supply means adapted to be operated under adverse traffic conditions for setting the automatic air release valve in position to set the brakes, an engineer's valve, a valve for disabling the engineer's valve from recharging the train pipe line for a prescribed period and thereby preventing him from releasing the brakes, means to supply air pressure to said disabling valve to set the same in its disabling position when the brakes are set by the automatic air release valve, and means for causing the release of air pressure from said disabling valve after the elapse of the prescribed period of time to thereby permit the effective operation of said engineer's valve for recharging the train line pipe, substantially as described.

7. In combination an air reservoir and train pipe line, an automatic air release valve, air supply means adapted to be operated under adverse traffic conditions for setting the automatic air release valve in position to set the brakes, an engineer's valve, a valve for disabling the engineer's valve from recharging the train pipe line for a prescribed period and thereby preventing him from releasing the brakes, means to supply air pressure to said disabling valve to set the same in its disabling position when the brakes are set by the automatic air release valve, and means for causing the release of air pressure from said disabling valve after the elapse of the prescribed period of time to thereby permit the effective operation of said engineer's valve for recharging the train line pipe, said disabling valve controlling the flow of pressure for recharging the train line.

8. In combination, an air reservoir, and train pipe line, an automatic air release valve, air supply means adapted to be operated under adverse traffic conditions for setting the automatic air release valve in position to set the brakes, an engineer's valve, a valve for disabling the engineer's valve from recharging the train pipe line for a prescribed period and thereby preventing him from releasing the brakes, means to supply air pressure to said disabling valve to set the same in its disabling position when the brakes are set by the automatic air release valve, and means for causing the release of air pressure from said disabling valve after the elapse of the prescribed period of time to thereby permit the effective operation of said engineer's valve for recharging the train line pipe, said disabling valve controlling the flow of pressure for recharging the train line and an air pressure supply connection to said disabling valve under control of the engineer to deliver air pressure thereto after the disabling pressure has been released to move it from its disabling position to a position for recharging the train line, substantially as described.

9. In combination in an air brake apparatus, an automatic air release valve, air supply means adapted to be operated for operating the automatic air release valve, an engineer's valve, a valve for disabling the engineer's valve for preventing him from releasing the brake for a prescribed period of time, said disabling valve comprising a casing and a piston therein, a pipe for delivering pressure to one side of the said piston for moving it into disabling position, automatic means for bleeding said pipe of pressure after a prescribed period of time, an engineer's valve, and an air pressure supply connection to the other side of said piston under the control of the engineer to move it from its disabling position, after said bleeding takes place, to a position opening said pipe which supplies pressure to the train line.

10. In combination in an air brake apparatus, an air reservoir and train line pipe, an automatic air release valve for said train pipe to effect the setting of the brakes with means adapted for operating it, an engineer's automatic brake valve, an engineer's independent brake valve, a valve for disabling the engineer's automatic brake valve to prevent recharging the train line and means for restoring the automatic release valve to normal position for rendering said disabling valve operable by the engineer's independent brake valve after a prescribed period of time has elapsed and thus ineffective against the engineer's valve, substantially as described.

11. In combination in an air brake apparatus, an air reservoir, a train pipe, an automatic air release valve for said train pipe to to effect the setting of the brakes, a connection for delivering air to said valve for operating the same, a trigger valve controlling said connection and adapted to be operated under adverse traffic conditions, an engineer's valve, a valve for disabling the engineer's valve when the automatic valve is operated, a connection for delivering air to said valve to set it in disabling position when the automatic release valve is operated, and means operated by the building up of pressure in the connection beyond the trigger valve to cause the bleeding of said connections for the return of the automatic air release valve to normal position, and the return of the disabling valve to its normal position, and means for supplying air pressure, under the control of the engineer to the disabling valve for operating it.

12. In combination, in an air brake apparatus, an air reservoir, a train pipe, an automatic air release valve for said train pipe to effect the setting of the brakes, a connection for delivering air to said valve for operating the same, a trigger valve controlling said connection means for opening said valve under restrictive traffic conditions, an engineer's valve, a valve for disabling the engineer's valve when the automatic valve is operated, a connection for delivering air to said valve to set it in disabling position when the automatic release valve is operated, and means operated by the building up of pressure in the connections beyond the trigger valve to cause the bleeding of said connections for the return of the automatic release valve to normal position, and the return of disabling valve to its normal position, an air pressure connection to the disabling valve for operating it, under the control of the engineer, said disabling valve controlling delivery of air for recharging train pipe, substantially as described.

13. In combination in an air brake apparatus, an air reservoir, a train pipe, an automatic air release valve for said train pipe to effect the setting of the brakes, a connection for delivering air to said valve for operating the same, a trigger valve controlling said connections, and means for opening said valve under restrictive traffic conditions, an engineer's valve, a valve for disabling the engineer's valve when the automatic valve is operated, a connection for delivering air to said valve to set it in disabling position when the automatic release valve is operated, and a valve moving with the automatic release valve for controlling said connection.

14. In combination, an air reservoir, a train line, an engineer's valve, an automatic air release valve for the train line, air pressure connections adapted to be opened under restrictive traffic conditions for operating the said release valve, a valve for disabling the engineer's valve, an air pressure connection leading thereto, for delivering air to set said valve in disabling position, and means for releasing the pressure in said connection after a prescribed period, to render the disabling valve ineffective against the engineer's valve, substantially as described.

15. In combination, an air reservoir, a train line, an engineer's valve, an automatic air release valve for the train line, air pressure connections adapted to be opened under restrictive traffic conditions for operating the said release valve, a valve for disabling the engineer's valve, an air pressure connection leading thereto, for delivering air to set said valve in disabling position, and means for releasing the pressure in said connection after a prescribed period, to render the disabling valve ineffective against the engineer's valve, and means for releasing the air pressure, from said air release valve for its return to normal position.

16. In combination in an air brake apparatus, an air reservoir, a train line pipe, a trigger valve adapted to be opened under restrictive traffic conditions, an automatic release valve controlled by air pressure delivered thereto through the trigger valve, an engineer's valve, a valve for disabling the engineer's valve after the brakes are automatically set by the automatic release valve, means for locking the trigger valve in operated position, and means for unlocking said trigger valve to return to normal position, the latter means being actuated by the building up of pressure, beyond said trigger valve, said trigger valve when returned to normal position permitting the bleeding of air pressure from the automatic air release valve, and the disabling valve to thereby permit the engineer at his will to release the brakes by recharging the main train line pipe by operating the engineer's valve, substantially as described.

17. In combination in an air brake apparatus, an air reservoir, a train line pipe, an automatic air release valve, a pressure connection leading to said valve, a trigger valve controlling said pressure connection, means for operating said trigger valve, an engineer's valve, a valve for disabling the engineer's valve to prevent the recharging of the train line pipe and the release of the brakes, a pressure connection leading to said disabling valve from the casing of the automatic release valve, and a valve moving with the automatic release valve for controlling the air supply through the said last mentioned connection to the disabling valve, substantially as described.

18. In combination in an air brake apparatus, an air reservoir, a train pipe, an automatic air release valve for releasing air from the train pipe, to set the brakes, a pressure connection for supplying air for operating the said air release valve, a trigger valve controlling the said air pressure connection and controlling also a bleeding port from said air pressure connection, means for operating said trigger valve to supply pressure for operating the automatic air release valve, an engineer's valve, a valve for disabling the engineer's valve to prevent the engineer from recharging the train line pipe and releasing the brakes, an air pressure supply connection to the said disabling valve, a valve moving with the automatic air release valve for controlling the said air pressure connection to supply air thereto when in one position and to allow the pressure to bleed from said disabling valve in another position, and means operated by the building up of air pressure between the trigger valve, and the automatic air release valve for restoring the trigger valve to normal position to thereby bleed pressure from the automatic air release valve, substantially as described.

19. In combination in air brake apparatus, an air reservoir, a train line pipe, an automatic release valve to release air from the train line pipe, a casing in which said valve slides, a piston for moving the valve to its release position and means for returning the valve to its closed position, a trigger valve controlling the supply of air pressure to the said piston means for operating the trigger valve, a bleeding port at the said trigger valve controlled thereby for bleeding the pressure from said piston valve, an engineer's valve, a valve for disabling the engineer's valve to prevent him from recharging the train pipe and releasing the brakes, a pressure connection to the said disabling valve, a valve sliding with the automatic air release valve, and controlling the inlet of air to the said disabling valve connection, and also the bleeding of air pressure therefrom and means operated by the building up of pressure between the trigger valve and the automatic air release valve for returning the trigger valve to normal position to thereby reduce pressure on the automatic air release valve allowing the same to return to closed position and setting the control valve of the connection leading to the disabling valve in position to reduce the pressure at said disabling valve, a connection to deliver air pressure at the will of the engineer to the disabling valve to operate the same when pressure has been removed from the said disabling valve, said disabling valve controlling recharging of the train line pipe, substantially as described.

20. In combination in an air brake system, a valve controlling air pressure thereto, means operated by air pressure for actuating the valve, means operating under restrictive traffic conditions for controlling the air supply to said valve actuating means, a lock for holding the valve in its actuated position and means for restoring the valve to normal position including means actuated by air pressure for releasing the lock and means actuated by air pressure for moving the valve when released to normal position, substantially as described.

21. In combination in air brake apparatus a valve, an air cylinder, a piston therein connected with the valve for moving it in one direction to supply air, an air cylinder having a piston therein connected with the valve for operating it in the opposite direction for resetting the valve to normal position, means operating under restrictive traffic conditions for supplying air pressure to the first cylinder, an air pipe, the supply to which is controlled by said valve, and a connection between the said air pipe and the said second cylinder for supplying pressure, when built up in said pipe, to said cylinder for operating its piston, substantially as described.

22. In combination in an air brake apparatus, a controlling valve for controlling air pressure, an automatic air release valve to which said controlling valve supplies air, air operated means for operating the controlling valve, a device for supplying air to said air operated means for operating the said controlling valve one way, and means operated by the building up of the air pressure beyond the said controlling valve and between it and the automatic release valve for restoring said valve to normal position, substantially as described.

23. In combination in an air brake apparatus, a valve for controlling air pressure, air operated means for operating the valve, a device for supplying air to said air operated means, and means operated by the building up of the air pressure beyond the said valve for restoring said valve to normal position, a lock for holding the valve in operated position and air operated means for releasing the lock, said air operated means being actuated by the pressure built up beyond said valve, substantially as described.

24. In combination in an air brake apparatus, a valve for controlling air pressure, air operated means for operating the valve, a device for supplying air to said air operated means, and means operated by the building up of the air pressure beyond the said valve for restoring said valve to normal position, a lock for holding the valve in operated position and air operated means for releasing the lock, said air operated means being actuated by the pressure built up beyond said valve, said built up pressure acting first on the lock releasing means and then on the means for returning the valve.

25. In combination in air brake apparatus, a valve controlling air pressure, air operated means for actuating the valve, to turn the air into the system, air operated means for returning the valve to normal position, a device for delivering air to means for actuating the valve, a lock for the valve to hold it in operated position, an air cylinder and piston, means operated thereby for releasing the lock, a port for supplying air pressure, when built up beyond the valve, to the said cylinder and piston for releasing the lock and a passage leading from the said cylinder for supplying the built up pressure to the air operated means for returning the valve, substantially as described.

26. In combination in an air brake system, a rotary valve controlling air supply, said valve having an arm projecting therefrom, a pair of air cylinders and pistons, one of which is on one side of the arm and the other on the other side of said arm, means operated under restrictive traffic conditions for supplying one cylinder with air, and a passage leading to the other cylinder from the system at a point beyond the valve to receive air pressure when built up in said system, substantially as described.

27. In combination in an air brake system, a rotary valve controlling air supply, said valve having an arm projecting therefrom, a pair of air cylinders and pistons, one of which is on one side of the arm and the other on the other side of said arm, means operated under restrictive traffic conditions for supplying the cylinder with air, and a passage leading to the other cylinder from the system at a point beyond the valve to receive air pressure when built up in said system, a second arm projecting from the valve, a lock to engage said arm, and a cylinder and piston with means operated thereby for releasing the lock, said cylinder receiving the air built up beyond the said valve, substantially as described.

28. In combination in an air brake apparatus, an equalizing air reservoir, a train pipe, an engineer's automatic brake valve, an automatic air release valve for setting the brake by releasing air from the train pipe, means operating under restrictive traffic conditions for delivering air pressure from the equalizing reservoir to the automatic release valve to set it in position for operating the brakes, and a disabling valve to which air pressure is automatically supplied when the brakes are set, an air passage from the automatic brake valve to charge the train pipe said passage being controlled by said disabling valve, and means for automatically reducing the operative pressure at the automatic air valve and disabling valve and an air pipe connection between the engineer's independent brake valve and the disabling valve for restoring it to its former position, after the operative air pressure has been removed therefrom, said disabling valve then opening the passage for delivering air to the train pipe, from the automatic brake valve, substantially as described.

29. In combination in an air brake apparatus, an air reservoir, a train pipe, an automatic air release valve for releasing air from the train pipe to set the brakes, a connection leading thereto to deliver air pressure to said valve, an air supply valve controlling the said connection, air pressure operated means for opening said valve, air pressure operated returning means for said valve, a lock for said valve, air pressure operated means for releasing the lock, said valve returning means and said lock releasing means being operated by the building up of pressure between the said air supply valve and the automatic air release valve, a disabling valve, a connection for supplying air pressure admitted by the air supply valve, to the disabling valve, means for bleeding the pressure from the automatic air release valve and the disabling valve when the air supply valve is returned to normal position, and a connection from the engineer's valve to the disabling valve to restore the same to normal position, and a connection for supplying reservoir pressure to the train pipe for releasing the brakes controlled by the disabling valve, substantially as described.

30. In combination in an air brake apparatus, an air reservoir, a train pipe, an air release valve for releasing air pressure from the train pipe for setting the brakes, a valve controlling reservoir pressure to the air release valve, air pressure actuated means for opening said valve, a device operated under restrictive traffic conditions for delivering air pressure to said air actuated means, air pressure actuated means for returning the air supply valve to normal or closed position, said means being actuated by the building up of pressure between the said air supply valve and the air release valve, a disabling valve, a connection for delivering air pressure, admitted by the air supply valve, to the disabling valve to move it to disabling position, means for bleeding the pressure from the air release valve and the disabling valve, a connection for delivering air pressure from the engineer's valve to the disabling valve to restore the same to normal position, and a connection for delivering air pressure to the train pipe for releasing the brakes, said disabling valve controlling said air pressure, substantially as described.

31. In combination in an air brake apparatus, an air reservoir, a train pipe, an air release valve for releasing air pressure from the train pipe for setting the brakes, a valve controlling reservoir pressure to the air release valve, air pressure actuated means for opening said valve, a device operated under restrictive traffic conditions for delivering air pressure to said air actuated means, air pressure actuated means for returning the air supply valve to normal or closed position, said means being actuated by the building up of pressure between the said air supply valve and the air release valve, a disabling valve, a connection for delivering air pressure, admitted by the air supply valve, to the disabling valve to move it to disabling position, means for bleeding the pressure from the air release valve and the disabling valve, a connection for delivering air pressure from the engineer's valve to the disabling valve to restore the same to normal position, and a connection for delivering air pressure to the train pipe for releasing the brakes, said disabling valve opening said connection when operated by the air pressure from the engineer's valve, said bleeding means comprising a port leading to the atmosphere controlled by the air supply valve, substantially as described.

32. In combination in an air brake apparatus, a train pipe, an air release valve for releasing air pressure from the train pipe for setting the brakes, a valve controlling air pressure to the air release valve, air pressure actuated means for opening said valve, a device operated under restrictive traffic conditions for delivering air pressure to said air actuated means, air pressure actuated means for returning the air supply valve to normal or closed position, said means being actuated by the building up of pressure between the said air supply valve and the air release valve, a disabling valve, a connection for delivering air pressure, admitted by the air supply valve, to the disabling valve to move it to disabling position, means for bleeding the pressure from the air release valve and the disabling valve, a connection for delivering air pressure from the engineer's valve to the disabling valve to restore the same to normal position, and a connection for delivering air pressure to the train pipe for releasing the brakes, said disabling valves opening said connection, when operated by the air pressure from the engineer's valve, the supply of air pressure admitted by the air supply valve acting first on the air release valve and as a result of the movement of said valve then acting on the disabling valve, substantially as described.

33. In combination with an engineer's valve, automatic train stopping means comprising a pneumatically operated air release valve, and means operated pneumatically from the engineer's valve for automatically eliminating the functions of the automatic train stopping means when the engineer performs his duty in slowing the train on arriving at a danger signal, said automatic eliminating means being non-accessible for hand operation and operable only as a consequence of the engineer slowing the train, substantially as described.

34. In combination with an engineer's valve, automatic train stopping means on the train for setting the air brakes, an implement on the roadway for operating the automatic train stop, and means for automatically eliminating the functions of the automatic train stop system as a consequence of the engineer's operation of his valve to slow down the speed of the train on approaching a danger signal, said automatic train stop system including an automatic air release valve, a valve controlling air pressure thereto and supplying air when the roadway implement is effective to operate said controlling valve, and the said eliminating means for cutting out the action of the automatic train stop means consisting of an air operated valve to cut off the supply of air to the air releasing valve and a connection for supplying air to said eliminating valve to make the same perform its eliminating function when the engineer's valve is set in position to reduce speed, substantially as described.

35. In combination in a train control system, an automatic air release valve with means for setting it to release the air and set the brakes on approaching a danger signal, a disabling device for the engineer's valve consisting of a valve to cut off the air for recharging the train pipe, air pipe connections for supplying air for operating said air release valve and disabling device, an eliminating valve for cutting off the operating air to the said air release valve and disabling valve, and air supply means for delivering air for operating said eliminating valve, said air supply means being under the control of the engineer as a consequence of his reducing speed on approaching a danger signal, substantially as described.

36. In an automatic train stop system and in combination, an engineer's automatic brake valve, having an exhaust port for exhaust of pressure from the train pipe and connected with an equalizing reservoir, an engineer's independent brake valve, an automatic air release valve, means including air supply connections from the equalizing reservoir for operating said air release valve for the escape of the train pipe pressure when a caution signal is set, an engineer's disabling valve operating to disable the engineer's automatic brake valve when the air release valve is automatically operated to set the brakes, means for bleeding operative pressure from the automatic air release valve and the engineer's disabling valve to allow said valve to return to normal position and permit the engineer's automatic brake valve to function in restoring air pressure to the train pipe.

37. In an automatic train stop system and in combination, an engineer's automatic brake valve, having an exhaust port for exhaust of pressure from the train pipe and connected with an equalizing reservoir, an engineer's independent brake valve, an automatic air release valve, means including air supply connections from the equalizing reservoir for operating said air release valve for the escape of the train pipe pressure when a caution signal is set, an engineer's disabling valve operating to disable the engineer's automatic brake valve when the air release valve is automatically operated to set the brakes, means for bleeding operative pressure from the automatic air release valve and the engineer's disabling valve to allow said valve to return to normal position and permit the engineer's automatic brake valve to function in restoring air pressure to the train pipe, and a connection between the engineer's independent brake valve and the engineer's disabling valve to deliver air pressure thereto to restore it to normal position.

38. In an automatic train stop system and in combination, an engineer's automatic brake valve, having an exhaust port for exhaust of pressure from the train pipe and connected with an equalizing reservoir, an engineer's independent brake valve, an automatic air release valve, means including air supply connections from the equalizing reservoir for operating said air release valve for the escape of the train pipe pressure when a caution signal is set, an engineer's disabling valve operating to disable the engineer's automatic brake valve when the air release valve is automatically operated to set the brakes, means for bleeding operative pressure from the automatic air release valve and the engineer's disabling valve to allow said valve to return to normal position and permit the engineer's automatic brake valve to function in restoring air pressure to the train pipe, said engineer's automatic brake valve operating automatically to open its exhaust port for setting the brakes on reduction of pressure in the equalizing reservoir consequent upon rupture of any parts of the automatic system, substantially as described.

39. In train stopping apparatus, the combination with the train brake line and air release valve therefor, of a cylinder and piston for operating said valve, pipe connections from said cylinder to an air reservoir, a valve interposed in said pipe connections, means operated under restrictive traffic conditions for opening said valve, means for holding said valve open for a limited period, and means for rendering the valve holding means of a second coupled locomotive ineffective.

40. In combination in an air brake apparatus an air supply valve on the engine, means operated under restrictive traffic conditions for automatically opening said air supply valve, a valve operated automatically by the air from said air supply valve for automatically opening the train pipe for the application of the brakes, an air supply connection from the said air supply valve to the automatic air supply valve of a second coupled engine to disable the same and prevent it from automatically supplying air to the automatic air release valve of the second coupled engine, as a result of the effective operation of the air supply valve of the first engine, substantially as described.

41. In combination in an air brake apparatus on coupled locomotives, an air pressure supply valve on each locomotive, means for opening said supply valve under restrictive traffic conditions, means to set the brakes operated by the air pressure admitted by said valve, means for locking the air pressure supply valves in operated position, and air pressure actuated means for disabling the locking means of the second locomotive when the air is admitted by the valve on the first engine, substantially as described.

42. In combination in train control apparatus, an engineer's brake valve, an automatic air release valve controlling the train line pressure, controlling means controlled by restrictive traffic conditions for supplying equalizing reservoir air pressure to said air release valve for opening it to release train line air, an engineer's disabling valve, said valve being closed, to disable the engineer from recharging the train line, by equalizing reservoir air pressure supplied thereto by said controlling means.

43. In combination, an automatic air release valve for controlling train line air pressure, a trigger valve for supplying equalizing reservoir pressure to said automatic air release valve to open it, an engineer's brake valve, a disabling valve to prevent the engineer from recharging the train line, a connection for supplying equalizing reservoir air pressure to said disabling valve for setting it in disabling position, said connection being supplied through said trigger valve, means operated under restrictive traffic conditions for supplying equalizing reservoir pressure to said trigger valve for opening it, and means for restoring said trigger valve to closed position when equalizing reservoir air pressure builds up beyond it to the prescribed degree, substantially as described.

44. In combination, in train control apparatus an engineer's brake valve, an automatic air release valve, for causing when open reduction of train line air pressure, a controlling valve for supplying when open air pressure to the automatic air release valve for opening it, means for prolonging the open position of said valve, means for restoring said valve to closed position upon the building up of pressure to a prescribed degree in the connection between it and the automatic air release valve, a valve in said connection with means for operating it to close said connection to eliminate the operation of the automatic air release valve, as a consequent of the engineer operating his brake valve to retard the train, the said building up of air pressure to restore said controlling valve to closed position taking place between said controlling valve and said eliminating valve when the latter closes, said controlling valve supplying equalizing reservoir air to the automatic air release valve and the engineer's disabling valve.

45. In air brake systems for railway vehicles, the combination of an automatic brake valve controlling the release of train line air, a connection for supplying equalizing reservoir air pressure thereto, a valve controlling said connection, means for opening said valve automatically to supply air pressure when restrictive conditions exist ahead, said valve closing automatically by the building up of equalizing reservoir pressure between it and the automatic brake valve, said valve when closed opening a bleed port for the escape of air pressure from the said connection to allow the automatic valve to reset itself to closed position, substantially as described.

46. In combination, an engineer's automatic brake valve, an automatic air release valve controlling the release of train line air, an equalizing reservoir, means operating automatically for supplying equalizing reservoir air to the automatic air release valve for the discharge of train line air, pneumatic means whereby the operation of the automatic air release valve will be eliminated when the engineer places his valve in service position and will be restored by the engineer placing his valve out of service position, an engineer's disabling valve operated to disabling position automatically by equalizing reservoir air pressure, an engineer's straight air valve and a connection therefrom for supplying air for restoring the disabling valve to normal position, substantially as described.

47. In combination, an automatic air release valve, means for supplying air pressure thereto to set it for the discharge of train line air, said means including a valve with means for operating it automatically when restrictive conditions exist ahead, means for holding said valve open, and means for releasing said holding means and restoring said valve to closed position as a consequence of the air pressure building up between said valve and the automatic air release valve, substantially as described.

In testimony whereof, I affix my signature.

PATRICK J. CLIFFORD.